United States Patent
Fillhard

(10) Patent No.: US 12,233,494 B1
(45) Date of Patent: Feb. 25, 2025

(54) TOOL FOR ASSEMBLING A MAIN ASSEMBLY USING A SINGLE STROKE

(71) Applicant: GM Global Technology Operations LLC, Detroit, MI (US)

(72) Inventor: Chester Fillhard, Imlay City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/453,458

(22) Filed: Aug. 22, 2023

(51) Int. Cl.
B23P 17/04 (2006.01)
B23P 19/04 (2006.01)

(52) U.S. Cl.
CPC ............... B23P 17/04 (2013.01); B23P 19/04 (2013.01)

(58) Field of Classification Search
CPC ... B25B 27/0028; B25B 27/06; B25B 27/062; B25B 27/064; B25B 27/28; B25B 13/5083; B25B 13/54; B23P 19/12; B23P 19/08; B23P 19/084; B23P 19/006; B23Q 3/106–108; Y10T 29/53652; Y10T 29/53657; Y10T 29/53717; Y10T 29/53722; Y10T 29/53726; Y10T 29/53783; Y10T 29/53826; Y10T 29/5393; Y10T 29/53935; Y10T 29/53961; Y10T 29/5397; Y10T 29/53978; Y10T 29/53983; Y10T 29/53987

See application file for complete search history.

(56) References Cited

U.S. PATENT DOCUMENTS

| | | | | | |
|---|---|---|---|---|---|
| 1,049,173 | A | * | 12/1912 | Turek | B21D 39/20 29/280 |
| 1,225,265 | A | * | 5/1917 | Miller | B25D 5/00 33/671 |
| 2,477,270 | A | * | 7/1949 | Smith | B25B 27/06 29/257 |
| 3,731,364 | A | * | 5/1973 | Romero | B25B 27/18 29/261 |
| 5,224,255 | A | * | 7/1993 | Gracey | B25B 27/064 29/253 |
| 6,024,354 | A | * | 2/2000 | Yonezawa | B25B 5/061 269/309 |
| 2005/0278918 | A1 | | 12/2005 | El Dessouky | |
| 2016/0207184 | A1 | * | 7/2016 | Huang | B23P 19/10 |

FOREIGN PATENT DOCUMENTS

| | | | |
|---|---|---|---|
| DE | 102014004104 A1 | | 9/2015 |
| JP | 2016117122 A | | 6/2016 |

* cited by examiner

Primary Examiner — Tyrone V Hall, Jr.
(74) Attorney, Agent, or Firm — Honigman LLP; Matthew H. Szalach; Jonathan P. O'Brien

(57) ABSTRACT

A tool for attaching a first workpiece and a second workpiece to one another and to a support structure includes a housing and a plunger. The housing includes a main body, a neck portion, and a shoulder portion. The shoulder portion is disposed between the main body and the neck portion and has an outer diameter that is greater than an outer diameter of the main body. A bore extends from a first end within the main body to a distal end of the neck portion. The plunger is disposed within the bore and extends from the distal end of the neck portion. The plunger is biased in a first direction away from the shoulder portion and includes a gripper operable to extend away from an outer surface of the plunger in an expanded state to engage an inner surface of the first workpiece.

18 Claims, 9 Drawing Sheets

# TOOL FOR ASSEMBLING A MAIN ASSEMBLY USING A SINGLE STROKE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to a tool for assembling a first workpiece and a second workpiece to a support structure. For example, the tool may be configured to assemble a transmission, wherein a bearing is mounted onto a bearing support to form a subassembly and the subassembly is then mounted onto a pinion shaft. In such an example, the bearing is the first workpiece, the bearing support is the second workpiece, and the pinion shaft is the support structure.

Currently, the assembly of the first workpiece onto the second workpiece is performed using a first tool at a first workstation. The first tool is configured to position the first workpiece into alignment with the second workpiece, and then press the first workpiece onto the second workpiece. This may be done by holding one of the first workpiece and the second workpiece in place and pressing the other of the first workpiece and the second workpiece onto the held workpiece to form a subassembly. The subassembly is then transferred to a second workstation. The transfer may be performed manually or automated by conveyor or robotic arm.

The second workstation includes a second tool, different from the first tool. The second tool assembles the subassembly onto the support structure. To assemble the subassembly to the pinion shaft, the pinion shaft is pressed into a bore of the subassembly. During the assembly of the subassembly onto the pinion shaft, the bore of the subassembly must be aligned with the pinion shaft prior to assembly. In particular, the subassembly is press-fit onto the pinion shaft, which requires the second tool to exert a pressing force. Accordingly, the subassembly and/or the pinion shaft may be damaged if the bore of the subassembly is not properly aligned with the pinion shaft.

The second workstation may be equipped with a sensor for detecting the alignment of the subassembly with respect to the pinion shaft. However, the sensor adds costs, and the operation of the second tool is predicated upon the functioning of the sensor. The sensor may be an optical sensor such as a camera, or a proximity sensor such as an infrared light. Thus, should the sensor be obscured from detecting the subassembly, the worker must clear the obstacle.

While conventional tools adequately assembles a first workpiece to a second workpiece to form a subassembly and assembles the subassembly to a support structure, numerous workstations and steps are required. Accordingly, it is desirable to reduce the number of workstations, components, and steps required to assemble a first workpiece, a second workpiece and a support structure to improve efficiency.

SUMMARY

In one configuration, a tool for attaching a first workpiece and a second workpiece to one another and to a support structure includes a housing and a plunger. The housing includes a main body and a neck portion extending from the main body. The neck portion has an outer diameter that is smaller than an outer diameter of the first workpiece. The housing further includes a shoulder portion disposed between the main body and the neck portion. The shoulder portion includes an outer diameter that is greater than an outer diameter of the main body, the outer diameter of the neck portion, and an inner diameter of an aperture formed in the second workpiece. The housing further includes a bore extending from a first end within the main body to a distal end of the neck portion.

The plunger includes a first end disposed within the bore and a second end extending from the distal end of the neck portion, the plunger is biased in a first direction away from the shoulder portion and includes a gripper operable to extend away from an outer surface of the plunger in an expanded state to engage an inner surface of the first workpiece.

The tool may include one or more of the following optional features. For example, the tool may include a biasing element disposed within the bore and engaging the first end of the bore and the first end of the plunger. In such an aspect, the biasing element may be a spring, such as a coil spring.

In one configuration, the tool includes a rod disposed within the plunger, the rod is operable to selectively engage the gripper to move the gripper into the expanded state from a retracted state. In such an aspect, the rod is slidably disposed within the plunger.

In one configuration, the second end of the plunger includes a chamfer.

In one configuration, an outer diameter of the plunger is smaller than an inner diameter of the support structure.

The shoulder portion may define an engagement surface operable to engage an outer surface of the second workpiece adjacent to the aperture of the second workpiece.

In one configuration, the first workpiece may be a bearing having an inner race, the inner race having an outer diameter that is less than the outer diameter of the neck portion.

In another configuration, a method for attaching a first workpiece and a second workpiece together and to a support structure includes moving a tool having a main body, a neck portion, a shoulder portion, and a plunger slidably disposed within the main body in a first direction toward the first workpiece. The method includes engaging a distal end of the neck portion with a top surface of the first workpiece as the tool moves in the first direction and extending the plunger into an aperture of the first workpiece. The method further includes moving a gripper of the plunger from a retracted state to an expanded state to engage an inner surface of the aperture of the first workpiece and moving the tool in the first direction towards the second workpiece to engage the shoulder portion with an outer surface of the second workpiece adjacent to an aperture of the second workpiece. The method further includes pressing the first workpiece into an aperture of the second workpiece to form a subassembly as the tool moves in the first direction and pressing the subassembly to the support structure as the tool continues to move in the first direction.

In one configuration, the plunger is biased in a direction away from the main body. In such an aspect, the biasing element is positioned within a bore of the main body between a first end of the bore and a first end of the plunger. The biasing element may be a coil spring within the bore of the main body. Additionally or alternatively, the method may include providing a distal end of the plunger with a chamfer.

In one configuration, engaging a distal end of the neck portion with a top surface of the first workpiece includes engaging the distal end of the neck portion with an inner race of the first workpiece. In such a configuration, moving the gripper of the plunger from a retracted state to an expanded state to engage an inner surface of the aperture of the first workpiece includes engaging an inner surface of an inner race of the first workpiece.

In one configuration, moving the gripper of the plunger from a retracted state to an expanded state to engage an inner surface of the aperture of the first workpiece includes suspending the first workpiece by the gripper.

A distance from a bottom surface of the shoulder portion to a distal end of the neck may be substantially equal to a height of the second workpiece. Further, moving the gripper of the plunger from a retracted state to an expanded state may include moving a rod disposed within the plunger into contact with the gripper. Moving the rod into contact with the gripper may include translating the rod relative to and within a bore defined by the plunger.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
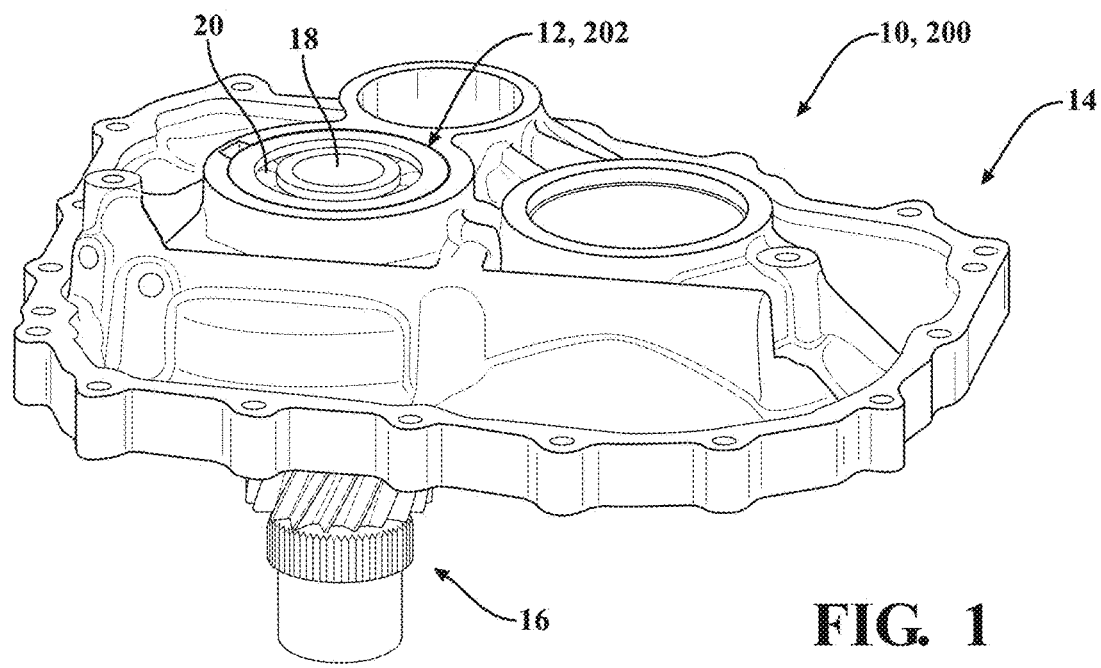
FIG. 1 is a perspective view of a main assembly showing a first workpiece, a second workpiece, and a support structure assembled together.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising." "including." and "having." are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first." "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry. e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

A tool and method for assembling a first workpiece to a second workpiece to form a subassembly, and assembling the subassembly onto a support structure using a single down-stroke is provided. The tool and method grips the first workpiece and automatically centers the first workpiece with respect to the support structure during the down-stroke and also centers the subassembly with respect to the support structure during the down-stroke.

Additionally, the tool and method may be configured to align the first workpiece and the second workpiece with respect to each other prior to assembly with the support structure. In particular, the tool is dimensioned to accommodate a difference in the height of the first workpiece and the second workpiece to position the bottom of the first workpiece flush with the bottom of the second workpiece.

Further, the tool is configured to hold the first workpiece in suspension. In such an aspect, the tool includes a gripper configured to move from a retracted state to an expanded state, wherein in the expanded state the gripper generates a tension-fit engagement with the first workpiece. In one aspect, the gripper is moved from the retracted stated to the expanded state by a movement of a ram along an axis.

Figure 2:
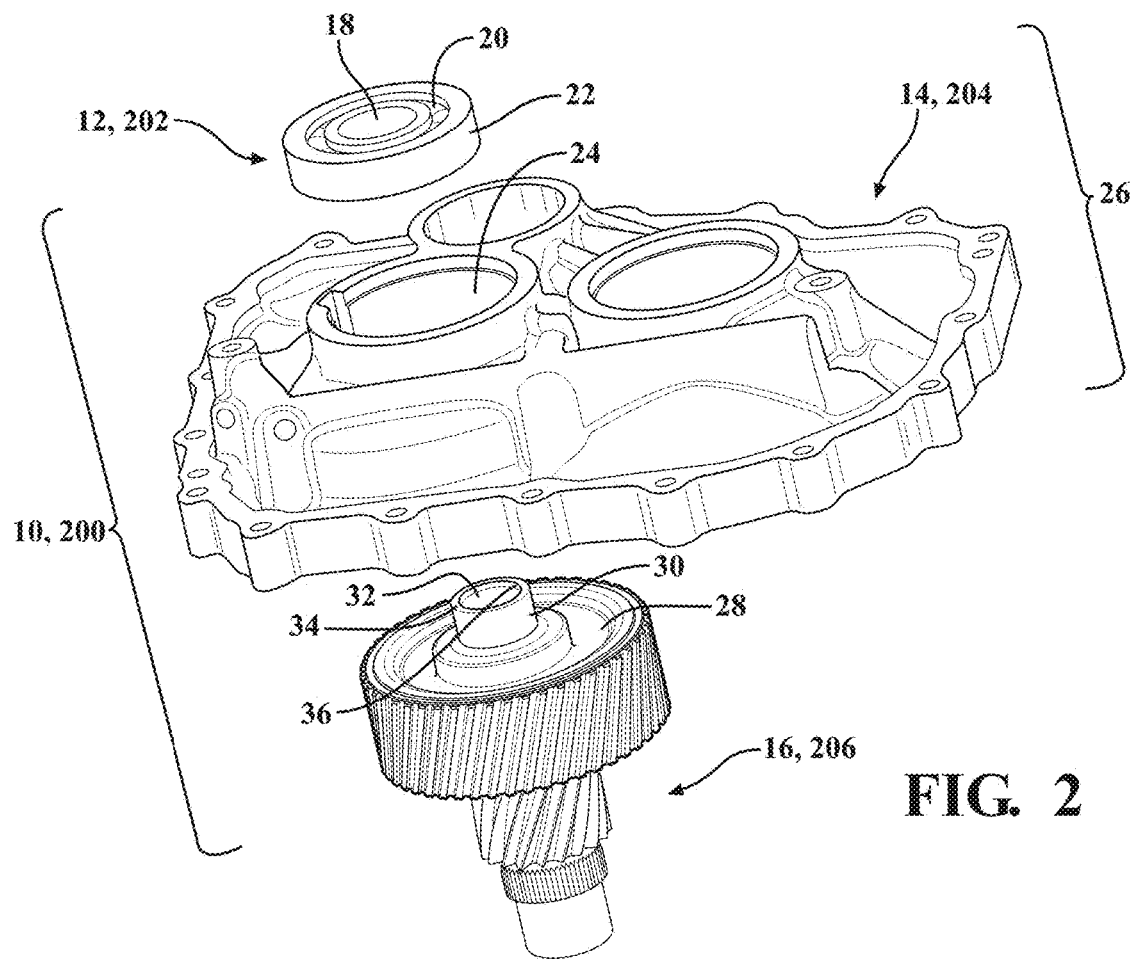
FIG. 2 is an exploded view of the assembly of FIG. 1.

With reference to FIGS. 1 and 2, an illustrative depiction of a main assembly 10 is provided. The main assembly 10 includes a first workpiece 12, a second workpiece 14, and a support structure 16. For illustrative purposes, the main assembly 10 is a transmission 200, or at least a portion of a transmission, and the first workpiece 12 is a bearing 202, the second workpiece 14 is a bearing support 204, and the support structure 16 is a pinion shaft 206. The bearing 202 assembled with the bearing support 204 form the subassembly 26. It should be appreciated that the first workpiece 12, the second workpiece, and the support structure 16 may be embodied by other components without deviating from the scope of the appended claims.

The first workpiece 12 is a cylindrical member having an aperture, referenced herein also as a "first bore 18," extending through the cylindrical member. In instances where the first workpiece 12 is a bearing 202, the first workpiece may include an inner race 20. In such an instance, the outer surface 22 of the first workpiece 12 is concentric with the inner race 20 and forms an outer perimeter of the first workpiece 12.

The second workpiece 14 defines a cover for enclosing components (not shown) of the transmission 200. The second workpiece 14 also includes an aperture, referenced herein also as a "second bore 24," extending through the body of the second workpiece 14. In one configuration, the second bore 24 has a constant radius and is dimensioned to slidingly receive the first workpiece 12.

The first workpiece 12 and the second workpiece 14 are assembled together to form a subassembly 26. The subassembly 26 is then attached to the support structure 16 to form the main assembly 10. In one aspect, first workpiece 12 is configured to slide completely through the second bore 24. As such, the first workpiece 12 must be positioned in the second workpiece 14 in a manner where the first workpiece 12 is not pushed past the second workpiece 14.

The support structure 16 includes a base 28 and a head portion 30 disposed on the base 28. The head portion 30 is configured to be disposed within the first bore 18 of the first workpiece 12. The head portion 30 is a generally cylindrical member and may include a through-hole 32. The head portion 30 includes a lip 34 defining a top portion of the head portion 30 and bounding the through-hole 32. In one configuration, an interior surface 36 of the lip 34 may be angled.

Figure 3:
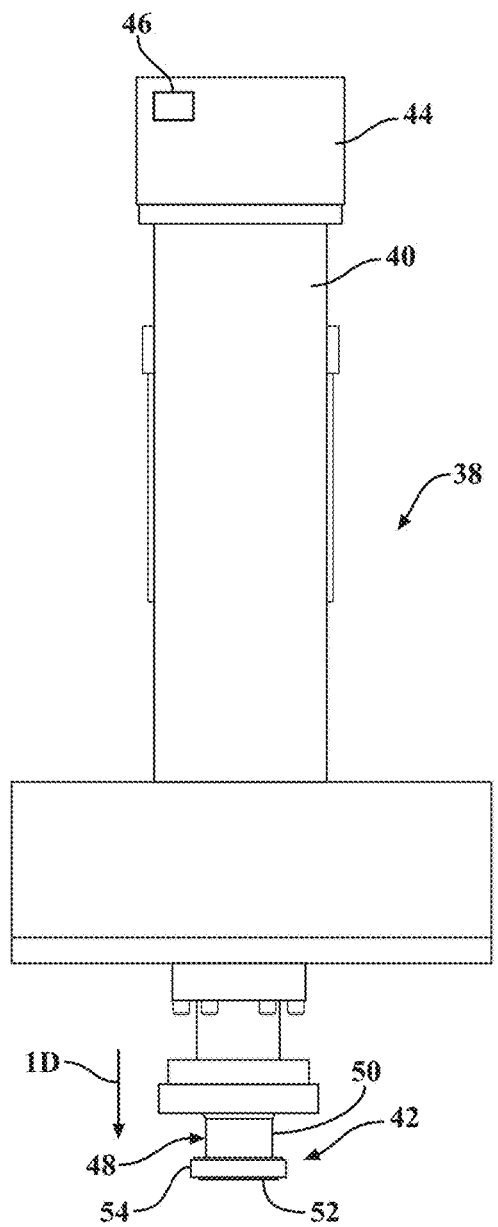
FIG. 3 is a side view of a tool configured to construct the assembly of FIG. 1.
Figure 11:
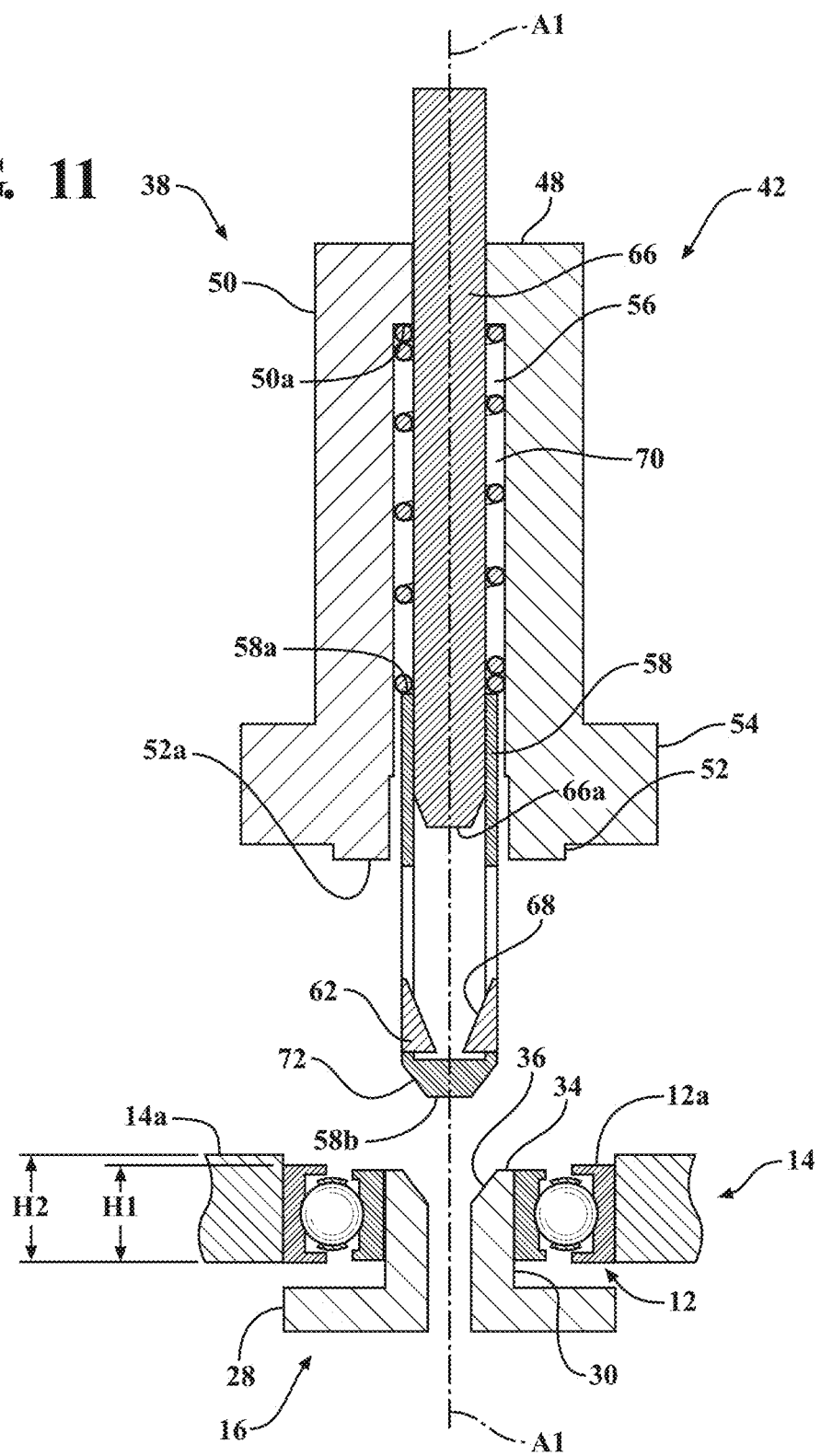
FIG. 11 is a cross-sectional view of the tool of FIG. 10 showing the tool moved back to a start position.

With reference now to FIG. 3, the main assembly 10 is assembled at a workstation 38. The workstation 38 includes a mount 40 and a tool 42 fixed to a bottom of the mount 40. The tool 42 may be driven by a driver 44 operable to move the tool 42 along a fixed axis and in a first direction "ID" away from the bottom of the mount 40. As shown in FIG. 3, the first direction is referenced herein as a "down-stroke," as the tool 42 moves in a direction down or away from the mount 40 during use. The driver 44 may be any device currently known or later developed that is configured to exert a force on the driver 44 to move the driver 44 away from the mount 40 such as, for example, a pneumatic pump, an electric motor, or the like. Once the down-stroke is completed, the tool 42 is moved to a start position "SP" (as illustrated in FIG. 11) and is ready to perform another down-stroke. The workstation 38 may include a controller 46 for controlling the operation of the tool 42. The controller 46 may reside within the mount 40 or may be remote from the workstation 38 and coupled to the workstation 38 via a wired or wireless connection. It should be appreciated that the workstation 38 may include well-known inputs (none shown), which provide for manual control of the tool 42 such as, for example, a start button, a stop button, a manual control button, and the like.

The tool 42 includes a housing 48 formed of a generally durable and rigid material such as stainless steel. The housing 48 is a generally cylindrical member and includes a main body 50, a neck portion 52, and a shoulder portion 54. The neck portion 52 is configured to press against a top surface 12a of the first workpiece 12 and the shoulder portion 54 is configured to press against a top surface 14a of the second workpiece (as illustrated in FIGS. 6-10).

Figure 6:
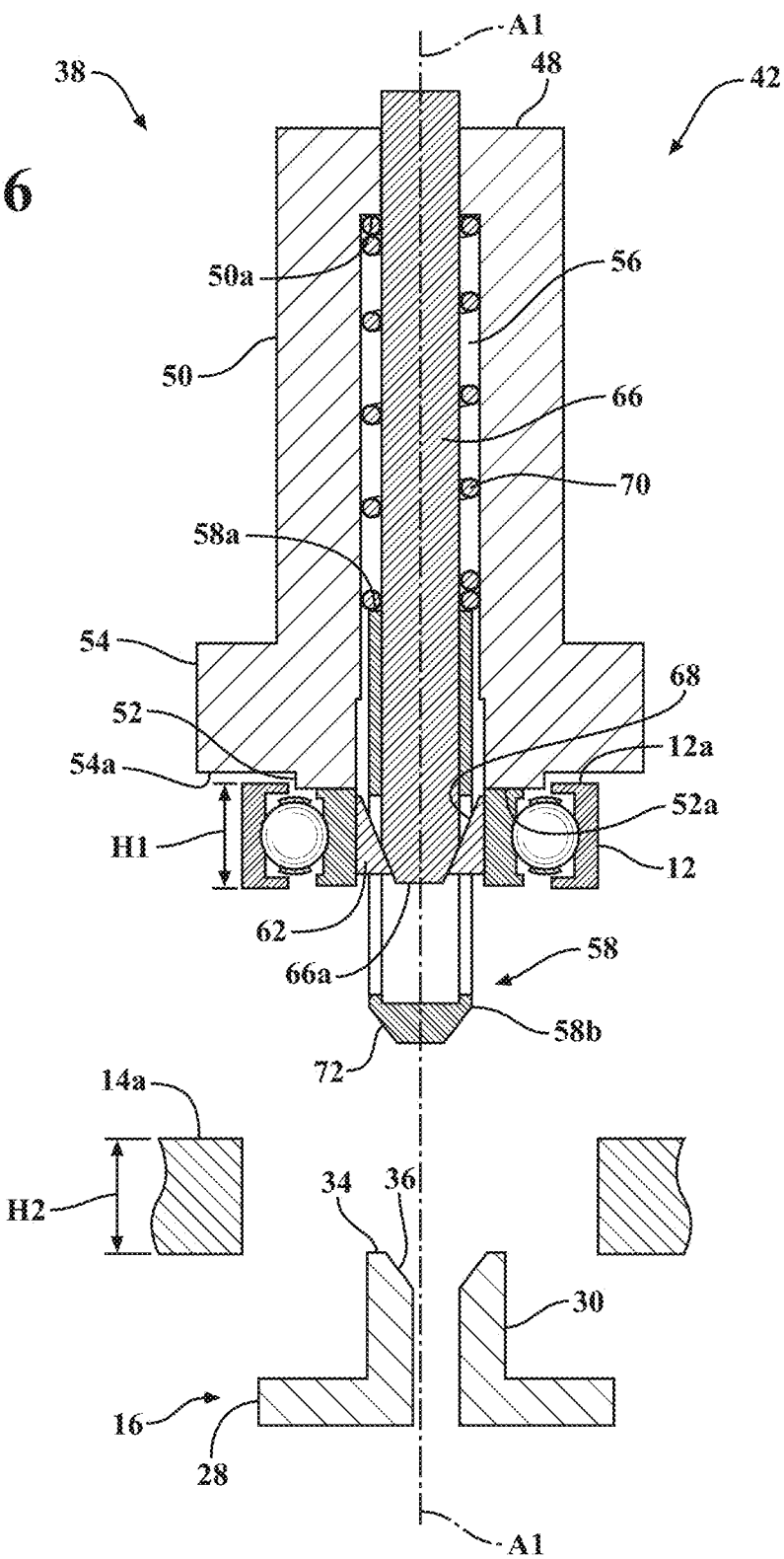
FIG. 6 is a cross-sectional view of the tool shown in FIG. 3 gripping the first workpiece.

With reference now to FIG. 6, the housing 48 further includes a main bore 56 extending from a first end 50a within the main body 50 to a distal end 52a of the neck portion 52. The neck portion 52 has an outer diameter that is smaller than an outer diameter of the first workpiece 12. The shoulder portion 54 is a radial flange disposed between the main body 50 and the neck portion 52. A diameter of the shoulder portion 54 is greater than a diameter of the main body 50, the diameter of the neck portion 52, and the inner diameter of the second bore 24 of the second workpiece 14.

Figure 4:
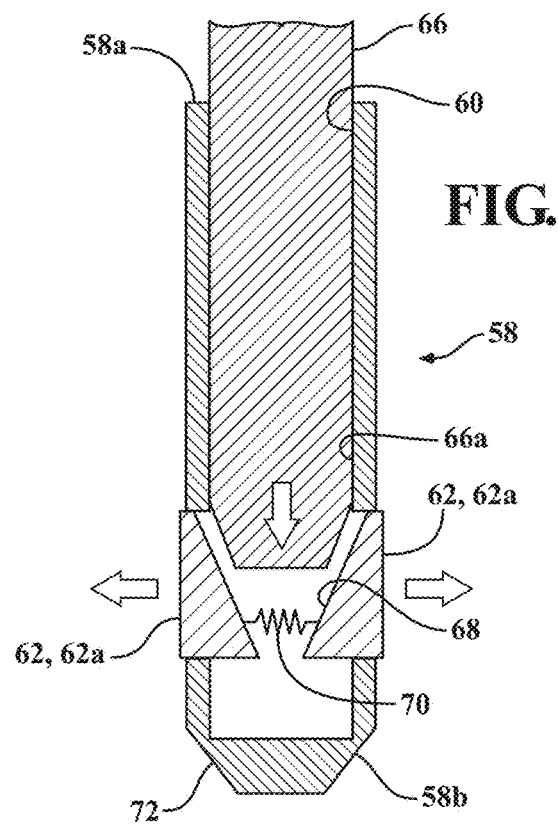
FIG. 4 is a cross-sectional view of a plunger for use in constructing the assembly of FIG. 1, the cross-sectional view taken along the length of the plunger.
Figure 5:
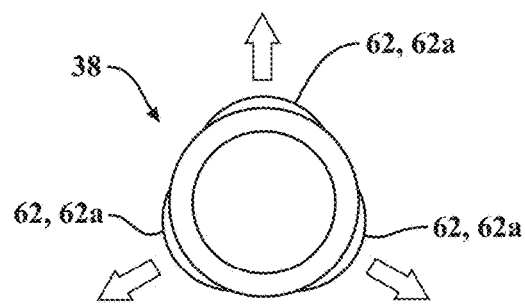
FIG. 5 is a top view of the plunger shown in FIG. 4.

With reference again to FIG. 6, and also to FIGS. 4 and 5, the tool 42 further includes a plunger 58. The plunger 58 is disposed within the main bore 56 of the housing 48. The plunger 58 is a generally cylindrical member having an inner bore 60 disposed on a first end 58a of the plunger 58 and enclosed by a second end 58b of the plunger 58. A diameter of plunger 58 is smaller than the diameter of the main bore 56, which allows the plunger 58 to be slidably disposed within the main bore 56 of the housing 48. The plunger 58 is disposed within the main bore 56 and the second end 58b extends from the distal end 52a of the neck portion 52. The plunger 58 is configured to be biased in the first direction "ID" away from the shoulder portion 54.

The plunger 58 includes a gripper 62 configured to move from a retracted state to an expanded state. FIG. 4 depicts the gripper 62 in the retracted state wherein the gripper 62 substantially resides within the inner bore 60 of the plunger 58. FIGS. 5-9 show the gripper 62 in the expanded state. In the expanded state, the gripper 62 is extended away from an outer surface of the plunger 58 to engage an inner surface of the first workpiece 12. In particular, the gripper 62 is configured to engage the first bore 18 of the first workpiece 12.

With reference again to FIGS. 4 and 5, and now to FIG. 6, the plunger 58 is movable between an extended position and a compressed position along the first direction ID. In such an aspect, the tool 42 may include a first biasing element 64 disposed within the main bore 56. One end of the first biasing element 64 engages a first end 50a of the main body 50 and the other end of the first biasing element 64 engages the first end 58a of the plunger 58. Any biasing element currently known or later developed may be modified for use herein, illustratively including a spring, such as a coil spring. Accordingly, the plunger 58 may be moved upwardly into the main bore 56 of the housing 48 by application of a load, thereby compressing the first biasing element 64. Once the load is removed, the first biasing element 64 is free to move the plunger 58 to the extended position.

The gripper 62 may be mechanically actuated to extend away from an outer surface of the plunger 58 in the expanded state and to reside substantially within the plunger 58 when in the retracted state. In one aspect of a mechanical actuation, the tool 42 includes a rod 66 disposed within the inner bore 60 of the plunger 58. The rod 66 is a generally cylindrical member having a solid body formed of a durable material such as steel. The rod 66 is configured to selectively engage the gripper 62 to move the gripper 62 into the expanded state from a retracted state. In such an aspect, the rod 66 is slidably disposed within the plunger 58. In one aspect, the rod 66 extends through the main bore 56 of the housing 48 to allow the rod 66 sufficient room to clear the gripper 62. The rod 66 may be slid by a driving mechanism such as a pneumatic pump (not shown), which may be controlled by the controller 46.

The gripper 62 is configured to grab the first workpiece 12 by generating a tension-fit engagement with an inner surface of the first workpiece 12. In particular, the gripper 62 is configured to generate a tension-fit engagement with the first bore 18 of the first workpiece 12. It should be appreciated that the tension-fit engagement is sufficient to hold the first workpiece 12 in suspension. The gripper 62 is illustratively shown as having three grips 62a, each grip 62a configured to expand radially relative to the inner bore 60 of the plunger 58 and each grip 62a is equidistant from each other. The grips 62a may be formed of a resilient material to help facilitate the engagement with the first workpiece 12. For example, the grips 62a may be formed of polyurethane, polypropylene, polystyrene, and the like.

In one aspect, the grips 62a include a sliding surface 68 disposed within the inner bore 60 of the plunger 58. The sliding surface 68 is angled with respect to a longitudinal axis "Al" of the plunger 58. The sliding surface 68 may be angled between 20 to 70 degrees relative to the longitudinal axis "Al" of the plunger 58. In such an aspect, a working end 66a of the rod 66 may be rounded so as to slide against the sliding surface 68 of the grips 62a, thereby displacing the grips 62a outwardly into the expanded state. The plunger 58 may further include a second biasing element 70 disposed within the inner bore 60 and configured to continuously urge the grips 62a into the retracted state. The second biasing element 70 may be a coil spring connecting each of the grips 62a to each other or a hinge spring connecting each grip 62a to the plunger 58 and continuously urging each grip 62a towards the retracted state.

With reference now to FIG. 6, the tool 42 may be configured to center the subassembly 26 with respect to the support structure 16. In one aspect, the second end 58b of the plunger 58 includes a chamfer 72. The chamfer 72 may be a rounded edge or a planar surface angled with respect to the longitudinal axis "Al" of the plunger 58. The chamfer 72 is configured to engage the lip 34 of the head portion 30 of the support structure 16. The chamfer 72 slides against the interior surface 36 of the lip 34 and centers the plunger 58 with respect to the head portion 30.

The tool 42 is configured to hold the first workpiece 12 during the down-stroke and insert the first workpiece 12 into the second bore 24 of the second workpiece 14. In such an aspect, an outer diameter of the plunger 58 is smaller than an inner diameter of the second bore 24 of the support structure 16. Further, the outer diameter of the first workpiece 12 is slightly smaller than the second bore 24 of the second workpiece 14 to accommodate the first workpiece 12 within the second bore 24 of the second workpiece 14.

The first workpiece 12 has a first height "H1" and the second workpiece 14 has a second height "H2" that is greater than the first height "H1." A bottom surface 54a of the shoulder portion 54 is generally planar and defines an engagement surface operable to engage an outer surface of the second workpiece 14 adjacent to the second bore 24 of the second workpiece 14. In particular, the bottom surface 54a of the shoulder portion 54 is configured to press against the top surface 14a of the second workpiece 14 concentric with the second bore 24.

In one configuration, the first workpiece 12 is a bearing 202, the second workpiece 14 is a bearing support 204, and the support structure 16 is a pinion shaft 206. In such a configuration, the bearing 202 includes the inner race 20 having an outer diameter that is less than the outer diameter of the neck portion 52. Further, the distal end 52a of the neck portion 52 is generally planar and defines a bottom surface that is spaced apart from the bottom surface 54a of the shoulder portion 54 a distance generally equal to a difference in height between the bearing support 204 and the bearing 202. As such, during a down-stroke, the plunger 58 grips the bearing 202 in a manner where the neck portion 52 presses against the top surface the bearing 202.

As the tool 42 continues with the down-stroke, the tool 42 centers the bearing 202 with respect to the pinion shaft 206 by engagement of the chamfer 72 of the plunger 58 with the angled interior surface 36 of the lip 34. Continuing with the down-stroke, the neck portion 52 presses against the top surface of the bearing 202, pressing the bearing 202 into the second bore 24 of the bearing support 204. The housing 48 is then advanced along the down-stroke and the shoulder portion 54 engages the top surface of the bearing support 204 at which point the bottom surface of the bearing support 204 and the bearing 202 are flush with each other and the subassembly 26 is formed.

Continuing with the down-stroke, the shoulder portion 54 and the neck portion 52 of the housing 48 move the subassembly 26 as one piece towards the head portion 30 of the pinion shaft 206 and presses first bore 18 of the bearing 202 of the subassembly 26 onto the head portion 30. When the lip 34 of the head portion 30 of the pinion shaft 206 abuts against the gripper 62, the controller 46 retracts the gripper 62 to the retracted position and the head portion 30 of the pinion shaft 206 is slid into the first bore 18 of the bearing 202 to complete the main assembly 10. Accordingly, the tool 42 assembles the transmission 200 using a single stroke. Further, during the down-stroke, the tool 42 aligns the bearing 202 with respect to the bearing support 204 and centers the subassembly 26 with respect to the pinion shaft 206.

Figure 12:
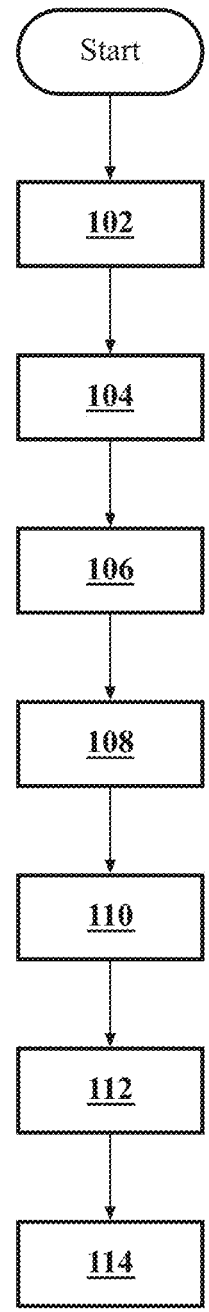
FIG. 12 is a flow chart showing a method for attaching a first workpiece and a second workpiece together and to a support structure.

With reference now to FIG. 12 a method 100 for attaching a first workpiece 12 and a second workpiece 14 together and to a support structure 16 using a single stroke is described. At block 102 the method 100 includes moving a tool 42 having a main body 50, a neck portion 52, a shoulder portion 54, and a plunger 58 slidably disposed within the main body 50 in a first direction ID toward the first workpiece 12. The method 100 proceeds to block 104 where a distal end 52a of the neck portion 52 is engaged with the top surface 12a of the first workpiece 12 as the tool 42 moves in the first direction. The method 100 proceeds to block 106 where the plunger 58 is extended into a first bore 18 of the first workpiece 12.

At block 108 a gripper 62 of the plunger 58 is moved from a retracted state to an expanded state to engage an inner surface of the first bore 18 of the first workpiece 12. At block 110, the tool 42 is moved in the first direction towards the second workpiece 14 to engage the shoulder portion 54 with an outer surface of the second workpiece 14 that is adjacent to a second bore 24 of the second workpiece 14. At block 112 the first workpiece 12 is pressed into the second bore 24 of the second workpiece 14 to form a subassembly 26 as the tool 42 moves in the first direction. At block 114 the subassembly 26 is pressed onto the support structure 16 as the tool 42 continues to move in the first direction.

The plunger 58 may be biased in a direction away from the housing 48. In such an aspect, the plunger 58 includes a first biasing element 64 that is positioned within main bore 64 of the main body 50 between a first end 50a of the main body 50 and a first end 58a of the plunger 58. The first biasing element 64 may be a coil spring within the bore of the housing 48.

The method 100 may include centering the second workpiece 14 and the support structure 16 with respect to each other. In particular, a second end 58a of the plunger 58 may include a chamfer 72 and the support structure 16 may include a head portion 30 having a lip 34 defining a top of the head portion 30, the lip 34 including an interior surface 36 that is angled inwardly. The chamfer 72 of the plunger 58 slides against the interior of the surface to center the plunger 58 with respect to the head portion 30 of the support structure 16.

In one aspect, engaging the distal end 52a of the neck portion 52 with the top surface 12a of the first workpiece 12 includes holding the first workpiece 12 in suspension. In such an aspect, moving the gripper 62 of the plunger 58 from the retracted state to the expanded state to engage an inner surface of the aperture of the first workpiece 12 includes engaging the first bore 18 of the first workpiece 12.

In one configuration, moving the gripper 62 of the plunger 58 from a retracted state to an expanded state to engage the first bore 18 of the first workpiece 12 includes holding the first workpiece 12 in suspension. Accordingly the first workpiece 12 may be elevated above the second bore 24 of the second workpiece 14 prior to assembly. Further, a distance from the bottom surface 54a of the shoulder portion 54 to a distal end 52a of the neck portion 52 is substantially equal to a height of the second workpiece 14. Accordingly, the tool 42 aligns a bottom surface of the second workpiece 14 with a bottom surface of the first workpiece 12 and prevents the first workpiece 12 from being pushed through the second workpiece 14.

In one aspect of the method 100, the gripper 62 is moved from the retracted state to the expanded state mechanically. In such an aspect, a rod 66 is disposed within the plunger 58 and may be moved into contact with the gripper 62, thereby pushing the gripper 62 outwardly with respect to the plunger 58 and into the expanded state. The rod 66 may be moved into contact with the gripper 62 by translating the rod 66 relative to and within a bore defined by the plunger 58.

With reference now to FIGS. 6-11 an operation of the tool 42 and method 100 is described. The operation of the tool 42 is performed by the controller 46 in a sequential manner as indicated in FIGS. 6-11. FIG. 11 shows the position of the tool 42 after having completed an assembly of the main assembly 10 wherein the tool 42 is moved to a start position "SP" after having completed a down-stroke.

FIG. 6 depicts a position of the tool 42 after having initiated a down-stroke. The plunger 58 is disposed within the first bore 18 of the first workpiece 12. In particular, the controller 46 positions the plunger 58 to have the gripper 62 disposed within the first bore 18. FIG. 6 further illustrates a point in the operation of the tool 42 where the gripper 62 is in an expanded state and engages the first bore 18 of the first workpiece 12, holding the first workpiece 12 in suspension. To achieve this position, the controller 46 has moved the rod 66 downwardly along the inner bore 60 of the plunger 58, as the rod 66 presses against the sliding surface 68 of the grips 62a the grips 62a of the gripper 62 are moved into the expanded state.

Figure 7:
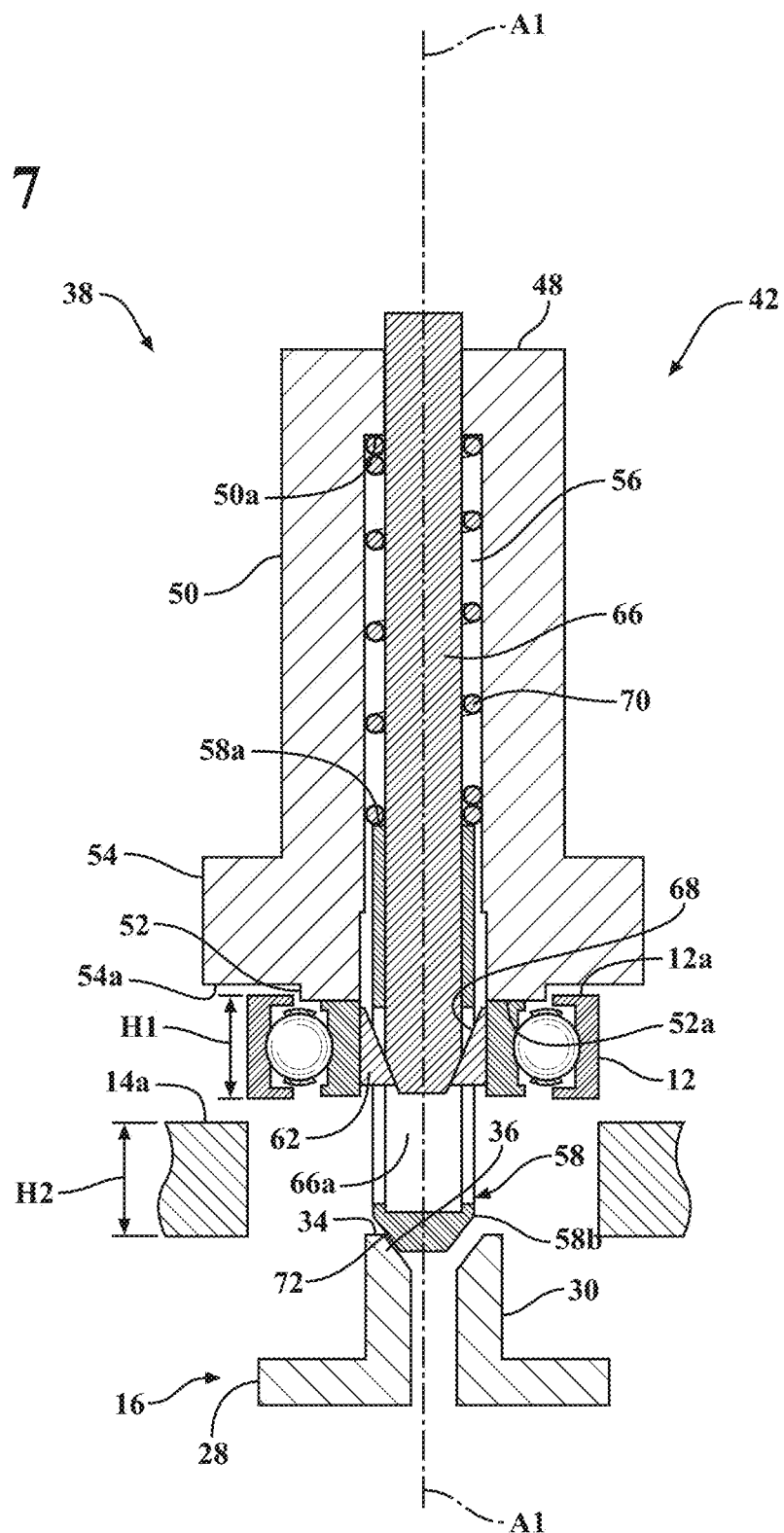
FIG. 7 is a cross-sectional view of the tool of FIG. 6 moved further in a first direction showing the tool pressing a support structure.

FIG. 7 shows a state of the tool 42 further along the down-stroke. The first workpiece 12 is held by the gripper 62 as the tool 42 is moved further along the down-stroke. The first biasing element 64 is fully extended and the chamfer 72 of the plunger 58 engages the lip 34 of the head portion 30 of the support structure 16. FIG. 7 shows an instance where the first workpiece 12 is not aligned with the second workpiece 14. In particular, the first workpiece 12 is offset from the center of the second bore 24 of the second workpiece 14.

Figure 8:
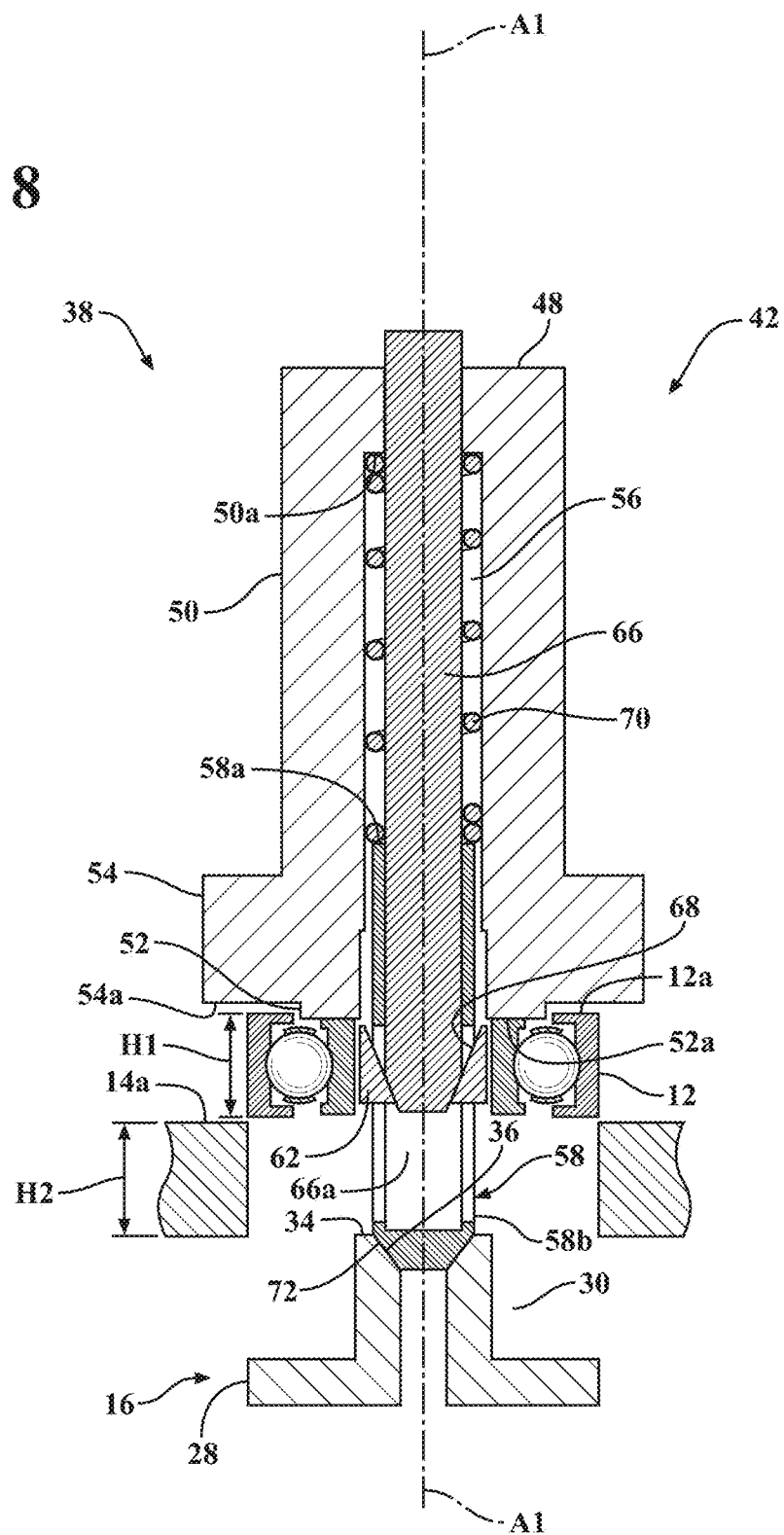
FIG. 8 is a cross-sectional view of the tool of FIG. 7 moved further in a first direction showing the tool centering itself onto the support structure.

FIG. 8 shows the tool 42 advanced further along the down-stroke relative to FIG. 7. The chamfer 72 of the plunger 58 has slid along the angled interior surface 36 of the lip 34 and the chamfer 72 is nested within the lip 34 of the head portion 30. As such, the plunger 58 brings the tool 42 and the first workpiece 12 into alignment with the second bore 24 of the second workpiece 14.

Figure 9:
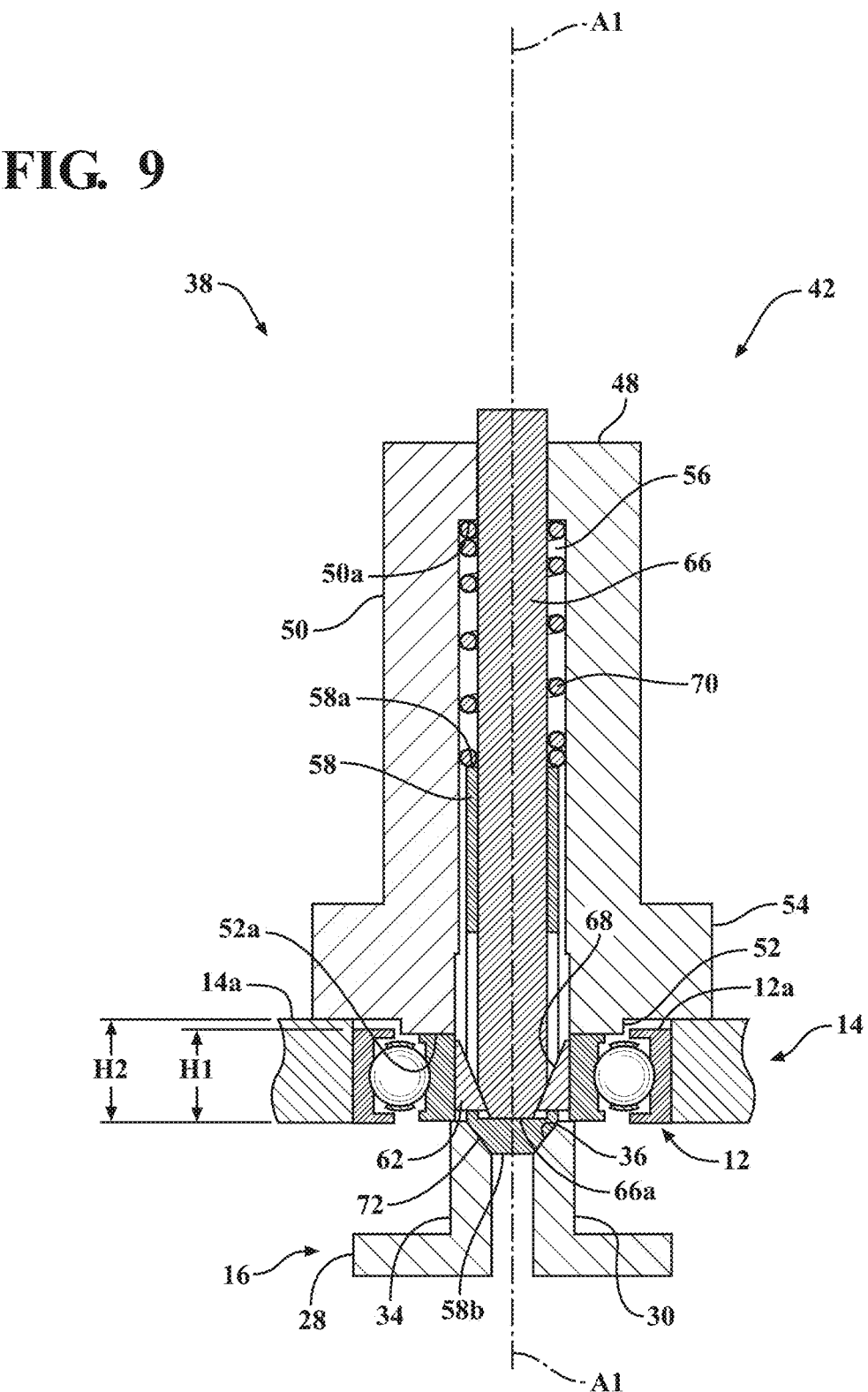
FIG. 9 is a cross-sectional view of the tool of FIG. 8 moved further in a first direction showing a housing of the tool pressing a first workpiece into a second workpiece.

FIG. 9 shows the tool 42 advanced further along the down-stroke relative to FIG. 8. The bottom surface of the neck portion 52 presses against the top surface of the first workpiece 12 pushing the first workpiece 12 into the second bore 24 of the second workpiece 14. As the tool 42 advances along the down-stroke, the bottom surface 54a of the shoulder portion 54 engages the top surface 14a of the second workpiece 14. The plunger 58 is stopped by the head portion 30 of the support structure 16 causing the first biasing element 64 to be compressed relative to the position of the first biasing element 64 shown in FIG. 8.

FIG. 9 also shows a clearance is formed between the top surface 12a of the first workpiece 12 and the bottom surface 54a of the shoulder portion 54. The clearance has a height, which is generally the same as the difference in height between the first workpiece 12 and the second workpiece 14. Accordingly, as the shoulder portion 54 engages the second workpiece 14, a bottom surface 14b of the second workpiece 14 is flush, or generally coplanar with a bottom surface 12b of the first workpiece 12. FIG. 9 also illustrates how the plunger 58 is centered with respect to the lip 34 of the head portion 30 and, thus, the head portion 30 of the support structure 16 is aligned with the first bore 18 of the first workpiece 12.

Figure 10:
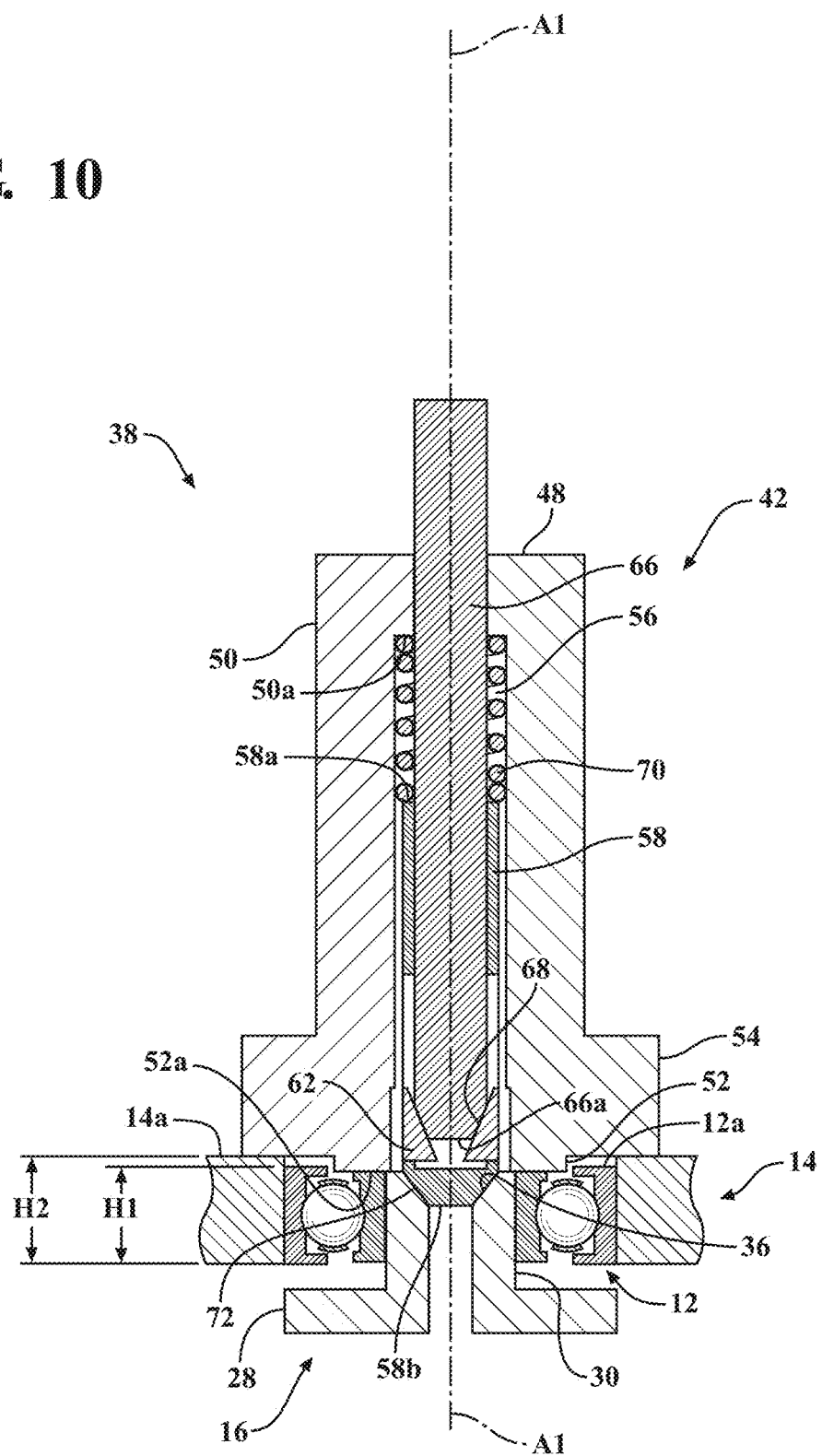
FIG. 10 is a cross-sectional view of the tool of FIG. 9 moved further in a first direction showing the first workpiece and the second workpiece moved together and pressed onto the support structure.

FIG. 10 shows the tool 42 advanced further along the down-stroke relative to FIG. 9. As the tool 42 is pressed further, the first biasing element 64 is more compressed relative to the position of the first biasing element 64 shown in FIG. 9. The controller 46 is operable to move the rod 66 upwardly, moving the gripper 62 from the expanded state to the retracted state. For instance, as the rod 66 clears the sliding surface 68 of the grips 62a, the second biasing element 70 is free to urge the respective grips 62a to the retracted state. Concurrently, the tool 42 is advanced along the down-stroke and the head portion 30 of the support structure 16 is free to be inserted into the first bore 18 of the first workpiece 12 to form the main assembly 10. The sequence of operation is controlled by the controller 46, which may time the movement of the gripper 62 into the retracted state with insertion of the head portion 30 into the first bore 18 of the first workpiece 12 to ensure that the head portion 30 is sufficiently seated within the first bore 18 prior to the gripper 62 releasing the first workpiece 12.

FIG. 11 shows the main assembly 10 assembled and the tool 42 moved to the start position "SP." It should be appreciated that the tool 42 may remain in a stationary position, in which case the main assembly 10 is transferred to another workstation for further assembly and another first workpiece 12, second workpiece 14, and support structure 16 is moved to the tool 42 for assembly. However, one skilled in the art would contemplate that the tool 42 may be moveable within a workstation 38, such as by a robotic arm, wherein a plurality of first workpieces 12 second workpieces 14 and support structures 16 are arranged for assembly.

Accordingly, a tool 42 and method 100 for assembling a main assembly 10 at a single workstation 38 and a single down-stroke is provided. Further, the tool 42 and method 100 includes gripping a first workpiece 12 and automatically centering the first workpiece 12 with respect to a support structure 16 during the down-stroke. Additionally, the tool 42 and method 100 may align the first workpiece 12 and the second workpiece 14 with respect to each other prior to assembly with the support structure 16. The tool 42 and method 100 disclosed herein reduces the number of workstations, components, and steps required to assemble a main assembly 10 relative to current practices.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system for manufacturing a main assembly, the system comprising:
    a first workpiece, wherein the first workpiece is a bearing having an inner race, the inner race including an outer diameter:
    a second workpiece;
    a support structure;
    a tool, the tool including a housing having a main body, a neck portion extending from the main body and having an outer diameter that is substantially equal to or less than an outer diameter of the first workpiece, a shoulder portion disposed between the main body and the neck portion and including an outer diameter that is greater than an outer diameter of the main body and an inner diameter of an aperture formed in the second workpiece, and a bore extending from a first end within the main body to a distal end of the neck portion; and
    a plunger having a first end disposed within the bore and a second end extending from the distal end of the neck portion, the plunger biased in a first direction away from the shoulder portion and including a gripper operable to extend away from an outer surface of the plunger in an expanded state to engage an inner surface of the first workpiece, and wherein the outer diameter of the inner race is substantially equal to the outer diameter of the neck portion, the tool configured to push the first workpiece entirely within the aperture of the second workpiece.

2. The system of claim 1, further including a biasing element disposed within the bore, the biasing element engaging the first end of the bore and the first end of the plunger.

3. The system of claim 2, wherein the biasing element is a spring.

4. The system of claim 3, wherein the spring is a coil spring.

5. The system of claim 1, further comprising a rod disposed within the plunger, the rod operable to selectively engage the gripper to move the gripper into the expanded state from a retracted state.

6. The system of claim 5, wherein the rod is slidably disposed within the plunger.

7. The system of claim 1, wherein the second end of the plunger includes a chamfer.

8. The system of claim 1, wherein an outer diameter of the plunger is smaller than an inner diameter of the support structure.

9. The system of claim 1, wherein the shoulder portion defines an engagement surface operable to engage an outer surface of the second workpiece adjacent to the aperture of the second workpiece.

10. A method for attaching a first workpiece and a second workpiece together and to a support structure, the method comprising:
    providing a tool comprising: a housing having a main body, a neck portion extending from the main body and having an outer diameter that is substantially equal to or less than an outer diameter of the first workpiece, a shoulder portion disposed between the main body and the neck portion and including an outer diameter that is greater than an outer diameter of the main body and an inner diameter of an aperture formed in the second workpiece, and a bore extending from a first end within the main body to a distal end of the neck portion; and a plunger having a first end disposed within the bore and a second end extending from the distal end of the neck portion, the plunger biased in a first direction away from the shoulder portion and including a gripper operable to extend away from an outer surface of the plunger, wherein the outer diameter of the first workpiece is substantially equal to the outer diameter of the neck portion;
    moving the tool in a second direction towards the first workpiece;
    engaging the distal end of the neck portion with a top surface of the first workpiece as the tool moves in the second direction;
    extending the plunger into an aperture of the first workpiece and into an aperture of the support structure;
    moving the gripper of the plunger from a retracted state to an expanded state to engage an inner surface of the aperture of the first workpiece;
    moving the tool in the second direction towards the second workpiece to engage the shoulder portion with an outer surface of the second workpiece adjacent to the aperture of the second workpiece;
    pressing the first workpiece into the aperture of the second workpiece to form a subassembly as the tool moves in the second direction;
    and pressing the subassembly to the support structure as the tool continues to move in the second direction.

11. The method of claim 10, wherein biasing the plunger in the first direction away from the main body includes positioning a biasing element within a bore of the main body between a first end of the bore and a first end of the plunger.

12. The method of claim 11, wherein positioning of the biasing element within the bore of the main body includes positioning a coil spring within the bore of the main body.

13. The method of claim 10, further comprising providing a distal end of the plunger with a chamfer.

14. The method of claim 10, wherein engaging a distal end of the neck portion with a top surface of the first workpiece includes engaging the distal end of the shoulder portion with a top surface of the second workpiece.

15. The method of claim 14, wherein moving a gripper of the plunger from a retracted state to an expanded state to engage an inner surface of the aperture of the first workpiece includes holding the first workpiece in suspension.

16. The method of claim 10, wherein a distance from a bottom surface of the shoulder portion to a distal end of the neck portion is substantially equal to a height of the second workpiece.

17. The method of claim 10, wherein moving a gripper of the plunger from a retracted state to an expanded state includes moving a rod disposed within the plunger into contact with the gripper.

18. The method of claim 17, wherein moving the rod into contact with the gripper includes translating the rod relative to and within a bore defined by the plunger.

\* \* \* \* \*